United States Patent [19]

Ugelstad

[11] Patent Number: 4,459,378

[45] Date of Patent: Jul. 10, 1984

[54] MONODISPERSE POLYMER PARTICLES AND DISPERSIONS THEREOF

[75] Inventor: John Ugelstad, Trondheim, Norway

[73] Assignee: Sintef, Trondheim, Norway

[21] Appl. No.: 363,497

[22] Filed: Mar. 30, 1982

Related U.S. Application Data

[63] Continuation-in-part of Ser. No. 186,008, Sep. 10, 1980, Pat. No. 4,336,173, which is a continuation of Ser. No. 10,989, Feb. 8, 1979, abandoned.

[30] Foreign Application Priority Data

Feb. 21, 1978 [NO] Norway ................................ 780596
Aug. 28, 1978 [NO] Norway ................................ 782920

[51] Int. Cl.³ ............................................ C08L 25/06
[52] U.S. Cl. .................................... 523/205; 524/458; 524/460; 526/201; 526/203
[58] Field of Search ....................... 524/457, 458, 460; 523/201, 205; 526/201, 203

[56] References Cited

U.S. PATENT DOCUMENTS

| | | | |
|---|---|---|---|
| 4,011,388 | 3/1977 | Murphy | 526/201 |
| 4,094,841 | 6/1978 | Mani | 524/813 |
| 4,113,687 | 9/1978 | Ugelstad | 524/794 |
| 4,186,120 | 1/1980 | Ugelstad | 524/458 |
| 4,247,434 | 1/1981 | Lovelace | 524/458 |

OTHER PUBLICATIONS

Dale M. Kornfeld, "Large–Size Monodisperse Latexes as a Commercial Space Product", NASA, Aug. 1977.

*Primary Examiner*—Paul R. Michl
*Attorney, Agent, or Firm*—Wenderoth, Lind & Ponack

[57] ABSTRACT

The invention provides monodisperse polymer particles and dispersions thereof, said particles having a diameter of preferably 5 μm or more. Such polymer dispersions are prepared by in a first step preparing a dispersion of smaller monodisperse polymer particles containing one or more materials having a very low solubility in water, and a relatively low molecular weight, then in a second step adding a partly water-soluble monomer which diffuses into the particles from the first step, and then effecting polymerization.

19 Claims, No Drawings

MONODISPERSE POLYMER PARTICLES AND DISPERSIONS THEREOF

This is a Continuation-in-part of Ser. No. 186,008, filed Sept. 10, 1980, now U.S. Pat. No. 4,336,173, which is a Continuation of Ser. No. 10,989, filed Feb. 8, 1979, abandoned. It relates to monodisperse polymer particles, dispersions thereof and a process for preparing such particles and dispersions.

In Norwegian patent application No. 76.0554 (patent No. 139,410), which discloses a process for preparing emulsions of somewhat water-soluble vinyl monomers, it has been demonstrated that it is possible to prepare stable emulsions of vinyl monomer by preparing in a first step an aqueous pre-emulsion of a material having a very low solubility in water, by an efficient homogenisation process, and then upon addition of water and emulsifier allowing the somewhat water-soluble vinyl monomer to diffuse into the droplets of the material having a very low solubility in water. The fact that the droplets in the pre-emulsion consisted of a material which combined very low water solubility and low molecular weight, had the effect that the droplets could absorb 50–500 times their own volume of the somewhat water-soluble vinyl monomer, with formation of stable dispersions which were subjected to polymerisation to form a latex. The pre-emulsion was in this case prepared by homogenisation, which leads to a broad distribution of the droplet size which became even broader after absorption of the vinyl monomer.

In Norwegian patent application No. 76.3984 (patent No. 141,367) there is disclosed the preparation of a dispersion of particles by ordinary emulsion polymerisation, but in contrast to ordinary polymer latexes, the particles contain a substantial fraction of oligomers having a much lower molecular weight. As a consequence of this the particles may take up 20–200 times their own volume of a somewhat water-soluble substance. In order to attain the formation of oligomers having low molecular weight by ordinary emulsion polymerisation there is used according to patent application No. 76.3984 an addition of chain transfer agent during the polymerisation, which causes the formation of shorter chains.

Both in the process described in patent application No. 76.0554 and in patent application No. 76.3984, there is obtained in a first step a pre-emulsion of particles which have the ability to take up a somewhat water-soluble material in an amount of 10–200 times more than corresponding polymer particles.

By the method described in patent application No. 76.3984 one avoids the homogenisation of the substance having a very low solubility in water and having a low molecular weight, which is described in patent application No. 76.0554. Further, the method disclosed in patent application No. 76.3984 provides greater possibilities for the preparation of more mono-disperse droplets or particles with a predetermined size. A disadvantage of the method described in patent application No. 76.3984, is however that the chain transfer agent which usually will be a mercaptan compound, is a badly smelling, partly toxic compound with which it is unpleasant to work. Further, addition thereof will often result in a reduction of the rate of polymerisation. It may also require that the chain transfer agent is added in portions or continuously during the polymerisation in order not to obtain a too broad distribution of molecular weight and a too high proportion of highly polymeric material.

According to the present invention there are provided monodisperse polymer particles which in addition to polymer contain a proportion of one or more low molecular weight material(s) having a very low solubility in water, or a residue of said material(s), in the following called Substance I.

The monodisperse particles according to the present invention are prepared by introducing said Substance I as such into the initial monodisperse particles. This takes place after the formation of the initial polymer particles by emulsion polymerisation by making it possible for Substance I to diffuse through the aqueous phase and to become absorbed in the initial particles. As the initial particles are monodisperse, each particle will absorb exactly the same amount of Substance I. Thus, in this first step there is prepared an aqueous dispersion of monodisperse particles or droplets which in addition to polymer contains a relatively low molecular weight water-insoluble Substance I. These particles will be able to absorb a very large amount of a partly water-soluble Substance II which comprises a monomer and which under the conditions given may diffuse through the aqueous phase and be taken up in the particles consisting of initial polymer and Substance I, and the monomer is then polymerized.

By having prepared in the first step particles which in addition to polymer also contain Substance I, there have been formed particles which are capable of taking up the partly water-soluble monomer-containing Substance II which may diffuse through the aqueous phase to the particles and become absorbed therein. In the second step one may then easily attain a ratio by volume between Substance II and particles which is 5–200 times higher than with particles of pure polymer. The Substance II used may be any partly water-soluble monomer-containing substance which is capable of diffusing through the aqueous phase. It may for instance be a monomer or a mixture of monomers and another substance.

The fact that the particles or droplets which are prepared in the first step are monodisperse, each particle or droplet containing the same amount of Substance I, leads to that the particles will absorb the same amount of Substance(s) II to form monodisperse droplets comprising chiefly Substance II (in addition to the initial polymer and Substance I). The subsequent polymerization therefore leads to monodisperse particles which have practically the same standard deviation as the initial polymer particles.

The method in which Substance I is incorporated in the first step in polymer particles prepared by ordinary emulsion polymerisation therefore makes it possible in a subsequent single step to prepare monodisperse polymer particles which are very much larger than the initial polymer particles with a very low standard deviation.

By ordinary emulsion polymerization one may relatively easily prepare monodisperse particles with a low standard deviation (<3%) and having a particle diameter of up to 0.5 $\mu$m. These may serve as the starting seed for the special seed process used according to the invention as described above, whereby large monodisperse polymer particles may be prepared.

It is very difficult to produce monodisperse particles of $\geq 2$ $\mu$m in diameter by ordinary seed techniques. With ordinary seed techniques monomer is added to the initial dispersion of monodisperse particles having a diameter of e.g. 0.5 μm in a volume ratio of monomer to polymer particles of 1-4, this ratio being limited by the amount of monomer which may be absorbed by the polymer particles. Then polymerisation is carried out by using a water soluble initiator. The particles produced will have a diameter of 0.6 to 0.8 μm. Then the process has to be repeated. It will be obvious that to produce particles larger than 2 μm and more so larger than 5 μm, the process has to be repeated several times. This fact invariably leads to that one gets a considerable coalescence of particles and/or considerable new formation of particles. Therefore one may only with difficulty and with small yields and often after repeated fractionation procedures prepare particles of about 2 μm in diameter. Particles of $\geq 5$ μm cannot at all be made by the conventional seed techniques.

To a very diluted dispersion of monodisperse polymer particles one might in principle add, all at the same time, an amount of monomer which if all monomer polymerized into the seed particles, would lead to particles of e.g. 2 μm from 0.5 μm seed particles. This would correspond to a monomer to particle weight ratio of about 60. However, only about 5% of this monomer would be absorbed in the initial seed particles. The swollen particles will absorb only small amounts of emulsifier. In order to stabilize the particles which grow steadily during the polymerisation, it is necessary to add emulsifier continuously. Similarly, initiator will have to be added stepwise or continuously during the polymerisation. This process will also lead to, and even more so than the known stepwise process described above, a very substantial coalescence and/or new formation of particles with resulting small yields and broad particle size distribution.

The method used to prepare the dispersions and particles according to the invention involves, as described above, the preparation in a first step of particles which can absorb large amounts of monomer. The above difficulties are thereby overcome, and said particles from the first step may be employed in a subsequent step for preparing particles larger than 5 μm in high yields, usually >90% and with a high degree of monodispersity.

For several purposes it is desirable to prepare larger particles ($\geq 2$ μm) having a uniform particle size, for instance as standard for microscopy, as model systems for separation, fluid flow, centrifugation, diffusivity measurement and dust investigations. Further, the particles may be used in electro kinetic studies and also within photography, for instance as a coating layer in X-ray film. They may also be used within biomedicine as a means for diagnosis and detection of antigens and antibodies in biological fluids. Monodisperse particles may be used as flattening agent for paint and powder paint. They may also be used as toners, for example in xerography. Further, the particles in dry form may be used for tribological purposes. By using as Substance II a mixture of a slightly water-soluble solvent, a vinyl monomer and a divinyl monomer, one may after swelling polymerize and remove the solvent in a per se known manner to obtain porous particles which are suitable for separation purposes. By using as Substance II a monomer or a monomer mixture and a low boiling substance, the present process may be used for the preparation of expanding microspheres. Large monodisperse particles may also be used for the preparation of material for ion chromatography wherein it is preferred that the particles are monodisperse to attain minimum pressure drop in the column.

The monodisperse particles may, if desired, be recovered from the dispersion in which they are formed, in a per se known manner, e.g. by centrifugation, sedimentation or filtration followed by drying.

According to the invention, the initial monodisperse polymer particles are swelled in the first step with the material having a very low solubility in water, Substance I. Substance I has a molecular weight of <5000, preferably <500, and a water solubility of $<10^{-2}$, normally $<10^{-4}$, preferably $<10^{-5}$ g/l of $H_2O$. In order to attain a transportation of Substance I having a very low solubility in water through the aqueous phase and into the particles, it is necessary to carry out the first step under conditions which facilitate this transfer of Substance I. The transfer may be facilitated in several ways. One may prepare a finely divided aqueous emulsion of Substance I which is added to the dispersion of monodisperse polymer particles. This distribution will facilitate the transfer by increasing the boundary surface towards water. This fine distribution of Substance I may be provided by using relatively large amounts of emulsifier or mixtures of emulsifiers which will result directly in finely divided emulsions, possible microemulsions, or in specific cases, mixed micelles and/or by using intensive homogenisation of Substance I, water and emulsifier.

The first step may optionally comprise that the swelling of the polymer particles in the first step with Substance I takes place continuously during the preparation of the polymer particles. This may be done by allowing Substance I to be present during the preparation of the polymer. It is then preferably mixed with the monomer or the monomer mixture from which the polymer is prepared, and in addition initiator is used. In order for Substance I to diffuse into the polymer particles as they are formed, the polymerisation is carried out under conditions which allow transport of Substance I through the aqueous phase.

A method which to a great extent will facilitate the transfer of Substance I to the particles, comprises that in the first step there is added a certain amount of a material which is a solvent for Substance I and at the same time is completely or partly soluble in water. This will increase the rate of transfer of Substance I to the particles by increasing the solubility in the aqueous phase. Examples of such solvents are acetone and lower alkanols. Normally said solvents are used in an amount of 1-100 percent of the amount of water, based on volume.

In case the monomer or one of the monomers in a mixture of monomers used for the preparation of the initial polymer particles into which Substance I is to be introduced, is relatively water-soluble, the monomer itself may serve as such a solvent. Examples of such relatively water-soluble monomers are vinyl acetate, acrylic acid, acrylonitrile, methyl acrylate and acrylic amide which then in a subsequent step are polymerized.

Advantageously it is also possible to employ a combination of the above methods which will comprise the preparation of Substance I in a finely dispersed form and the use of an excess of emulsifier or addition of a solvent miscible with water in the first step.

In those cases in which the glass transition temperature, Tg, of the polymer particles is above the temperature at which Substance I is introduced, the diffusion of Substance I into the polymer particles may be rate determining. In this case it may be advantageous to have present a small amount of a substance which will lower the Tg of the particles before introducing Substance I. This may for instance be accomplished by letting the original polymer particles contain a substantial amount of unreacted monomer or during the preparation of the original polymer particles to have present a substance which is sufficiently water-soluble to diffuse into the polymer particles as they are formed. Also this substance may be absorbed in premade polymer particles. The only purpose of this substance is to lower Tg and thereby facilitate transport of Substance I into the particles.

The transfer of Substance I to the polymer particles in the first step, so that they become swelled with Substance I, may be accomplished in several ways. Polymer particles are accordingly obtained containing Substance I in an amount of up to or even above 10, normally 0.05–5, particularly 1–4 times the amount of the polymer, based on volume. An essential feature of the present process is that before adding the somewhat water-soluble Substance II which is to diffuse into the polymer particles in the second step, the conditions must be such that while Substance II may diffuse through the aqueous phase into the polymer particles, the transport of Substance I through the aqueous phase in this second step of the process is effectively inhibited so that no Substance I may diffuse out of the polymer particles. Particles which are swelled with Substance I may be capable of taking up up to or even more than 1000, particularly 20–800 times their original volume of Substance II. The strong reduction of transport of Substance I from the particles before Substance II is added, which is a necessary condition for the method to work, will partly be attained directly when water is added before addition of Substance II. As particles containing Substance I should be charged with e.g. 800 times their original volume of Substance II, it will be necessary to dilute with water, according to the desired concentration in the final dispersion. Thus, if a dispersion is desired in which the ratio between water and Substance II is 1:1, water is added in step 2 in such an amount that the total amount of water will be the same as the amount of Substance II added in step 2. Normally the ratio between water and Substance II in the final dispersion will be from 80:20 to 20:80. Before addition of this amount of water there is present a relatively high concentration of those materials which have been added to facilitate the transport of Substance I to the particles. By addition of the large amount of $H_2O$ in the second step, the concentration of said materials will be strongly reduced, and thereby the possibility of transport of Substance I out of the particles will be considerably reduced. When using relatively large amounts of for instance acetone to promote a more readily transport of Substance I to the particles in the first step, it may be advantageous to evaporate it off before adding water and Substance II in the second step. It is an essential feature of the present invention for the preparation of the dispersion of Substance II, that addition of Substance I and Substance II takes place in two steps so that Substance I is absorbed in the particles in a first step with conditions enabling transport of Substance I, while Substance II diffuses into the particles under conditions which inhibit the transport of Substance I through the aqueous phase. Thus, it will be found that if Substance I and Substance II are first mixed and this mixture is then added to an aqueous dispersion of the polymer particles, and by addition of for instance acetone, it is made possible for both Substance I and Substance II to be transported through the aqueous phase to the particles, then both Substance I and Substance II will be taken up, but the total amount absorbed will be limited to 1–4 times the volume of the particles.

When the ratio between water and Substance II is less than 50:50 it may be advantageous to add Substance II in portions or continuously over a certain period.

As Substance I there may be used any material or mixture of materials which exhibit the given properties, very low water-solubility and relatively low molecular weight. It is further an advantage that they are non-crystalline at the temperature at which they are incorporated into the particles. It is also an advantage that Substance I is in a liquid form at the temperature at which Substance II is introduced into the particles in the second step, since in this case there will not only be attained the above mentioned strongly increased capacity to absorb Substance II, but also often a very strong increase in the rate of absorption. This is in particular the case when working with a polymer in the initial particles for which the glass transition temperature is above the temperature employed during the swelling with Substance II.

If Substance II comprises a vinyl monomer which is to be polymerized after having diffused into the particles containing Substance I, it may be advantageous to use as Substance I, wholly or in part, a water-insoluble vinyl monomer which may be co-polymerized with the vinyl monomer added in the second step. Examples of vinyl monomers which satisfy the above requirements with respect to Substance I, are stearyl vinyl ether and stearyl methacrylate. Suitable Substance II vinyl monomers are styrene, vinyl chloride and acrylates such as methyl and butyl acrylate and methacrylate, and vinyl esters such as vinyl acetate.

The weakness of the conventional seed method is, as described above, that the seed particles which consist of only polymer molecules are capable of absorbing only 1–4 times their own volume, leading to the complications and restrictions regarding size and monodispersity described above. If it is desired to prepare 500 g of latex particles from for instance 10 g of seed particles, this must then be made in several steps with stepwise addition of emulsifier. The 10 g of seed particles will absorb only up to 40 g of monomer. This will result only in a small increase in the surface, and since it is not desired to have too much emulsifier in the aqueous phase, the amount of emulsifier must be limited to an amount which becomes adsorbed on the surface of the swelled seed particles. After polymerisation, additional monomer and emulsifier are added, and the process is repeated. It will be obvious that this will require several steps before 500 g of latex particles have been formed with the known process.

By using, as according to the present invention, a seed consisting of polymer + Substance I, the seed particles will be capable of absorbing much greater amounts of monomer, it often being possible to add all monomer in one step, and the amount of seed employed may be greatly reduced. In the preparation of very large particles it may be necessary to repeat the process of swelling with monomer, possibly also with Substance I and initiator. In any case the number of steps will be greatly reduced in comparison with the number of steps necessary for the preparation of particles of the same size by using a common seed process. Further, the swelling of the particles with the large amount of monomer has the effect that a very large increase in the surface is attained. A consequence of this is that even if all emulsifier is added initially, it will to a very high extent become adsorbed on the surface of the swelled particles, and there will be very little emulsifier left in the aqueous phase, and therefore the formation of new particles in the aqueous phase will not take place.

As initiator for polymerisation, water-soluble initiators such as $K_2S_2O_8$ or $H_2O_2$ may be used. They are preferably added after swelling with monomer. An oil-soluble initiator may also be used. When using an oil-soluble initiator which is somewhat soluble in water, such as azobisisobutyric nitrile (AIBN), this may be added after the monomer has diffused into the particles or it may be dissolved in the monomer before the latter diffuses into the particles. When using oil-soluble initiators which are less water-soluble, such as lauroyl peroxide, it will be necessary to add this together with Substance I as the conditions are then, as described above, such that even substances having a very low solubility in water may be transported through the aqueous phase.

Initiators which possess the combination of low solubility in water and low molecular weight may also act as Substance I. It has been found that certain specific initiators which are liquid at the temperatures in question, are particularly favourable as Substance I. They may easily be incorporated in the particles according to the methods described above. An example of such an initiator is dioctanoyl peroxide.

Oil-soluble initiators which have a very low solubility in water, such as dioctanoyl peroxide, have the advantage in comparison with more water-soluble initiators such as AIBN, that they not only reduce the risk of formation of new particles in the aqueous phase, but they also reduce the risk of bulk polymerisation. With the latter oil-soluble, but also somewhat water-soluble, initiator, it is an absolute requirement that all monomer has been absorbed in the particles before the polymerisation is started by raising the temperature. Similarly, with this initiator care must be taken so that no monomer phase is formed by evaporation and condensation of monomer during the polymerisation. Oil-soluble initiators such as AIBN are sufficiently water-soluble to diffuse into the possible monomer phase and start a bulk polymerisation which will result in the formation of large lumps and thereby entail great disadvantages. By using an initiator having a very low solubility in water, such as dioctanoyl peroxide, the possibility of all monomer added in the second step not being absorbed, will not be of the same importance since the initiator has such a low water-solubility that it will not diffuse out of the particles through the aqueous phase to the possible monomer phase. Thus, if a certain monomer phase is intermediately present during the polymerisation, the only thing which may possibly happen is a thermal polymerisation therein, and monomer will primarily be absorbed in the particles containing the initiator as the polymerisation proceeds.

With such an oil-soluble initiator having a very low solubility in water one may therefore, if desired, even swell and polymerize in several steps at the polymerisation temperature without having to reduce the temperature before each swelling process with monomer, to prevent bulk polymerisation. Similarly, for the same reason it is possible to add vinyl monomer continuously during the polymerisation. Even in these cases it is an advantage that Substance I (which in this case is initiator) is liquid at the temperature in question, so that the rate at which the monomer is absorbed in the particles increases. The use of dioctanoyl peroxide or other greatly water-insoluble initiators alone or together with another Substance I which is not initiator has been found very suitable for the preparation of monodisperse particles having a large particle size.

For the preparation of large monodisperse particles according to the present invention one starts with a seed having relatively small monodisperse polymer particles which are charged with Substance I as described above and then with Substance II monomer which is then polymerized. The starting seed may be prepared by ordinary emulsion polymerisation under conditions which yield monodisperse particles. Such methods are well known in the literature, see for instance Woods, M. E., Dodge, J. S. and Krieger, I. M., J. Paint Tech. 40, 541 (1968).

These methods, which all are variations of ordinary emulsion polymerisation, are satisfactory for the preparation of monodisperse particles having a diameter up to approx. 0.5 μm. Monodisperse particles having a diameter above 1 μm are difficult to prepare by these methods, and monodisperse particles above 5 μm cannot be prepared by ordinary emulsion polymerisation, while they can easily be prepared according to this invention.

By the process according to the present invention it has been found possible to prepare monodisperse polymer particles with a very low standard deviation having a diameter $\geq 5$ μm, and accordingly the invention provides such monodisperse particles and dispersions thereof.

The essential feature of the present process is that monodisperse particles are prepared in a first step which in addition to polymer contain an essential proportion of the relatively low molecular weight Substance I having a low solubility in water, which provides particles having a greatly increased capacity of absorption and also resulting in increased rate of absorption. The particles containing Substance I are swelled in the next step with Substance II which is or comprises a monomer which after absorption is polymerized either by means of the initiator already present in the particles and/or by means of additional initiator or additives which increase the rate of formation of radicals in the particles. The advantages of this seed method in comparison with ordinary seed methods are as described above, the following:

The presence of Substance I in the seed particles entails an enormous increase in the ability of the seed particles to be swelled with monomer. Thereby, it is possible in one process cycle (i.e. first swelling the seed with Substance I and then with Substance II followed by polymerisation) to obtain a very large increase in the size of the particles. Further, the increased extent of swelling will result in a very large increase of the surface of the particles. Thereby the capacity to adsorb the emulsifier increases, so that all emulsifier may be added initially without any risk of having so much emulsifier present in the aqueous phase that formation of new particles takes place therein. In ordinary seed polymerisation, the emulsifier must be added continuously or stepwise to avoid formation of new particles in the aqueous phase.

Since the seed particles represent only a very small proportion of the final particles, it may be without importance for the properties of the final polymer dispersion which monomer is used in the first step, and it is accordingly possible to use a monomer in the first step which is different from that added in the second step.

The present invention may be used for the preparation of dispersions of any polymer obtained from a partly water-soluble monomer-containing material and mixtures of such which are capable of diffusing through the aqueous phase, which will require that Substance II has a water-solubility of $>10^{-4}$ g/l $H_2O$, preferably $>10^{-3}$ g/l $H_2O$. The ratio between the solubility of Substance I and Substance II is of essential importance. Thus, Substance II should be at least 10 times, preferably at least 100 times as water-soluble as Substance I.

Thus, when Substance I has a water-solubility of $10^{-4}$ g/l $H_2O$, Substance II should preferably have a water-solubility of above $10^{-2}$ g/l $H_2O$. On the other hand, if it is desired to prepare a dispersion of a Substance II with a water-solubility of $10^{-4}$ g/l $H_2O$, there should be used a Substance I having a water-solubility of preferably less that $10^{-6}$ g/l $H_2O$.

It has been found that even relatively small amounts of Substance I in the polymer particles will provide a considerable increase in the ability of the particles to absorb Substance II compared with particles of pure polymer in the case of relatively large particles. Such a system with large particles containing relatively little of Substance I, in addition to being obtainable from pure polymer dispersions, will be present after a process with swelling of particles having a relatively high content of Substance I with monomer which is then polymerized as described above. Particles have then been obtained which are much larger than the original particles, which means that the amount of polymer has greatly increased while the amount of Substance I is the same as before the process with swelling and polymerisation. It has been found that even with an amount of about 5 percent of Substance I, based on polymer, particles having a diameter of about 2 μm are capable of absorbing an amount of Substance II which is about 40 times higher than the amount of polymer particles, based on volume.

EXAMPLE 1

77 ml of $H_2O$, 11.7 ml of chlorododecane, 1.8 g of benzoyl peroxide, 9.3 ml of dichloroethane and 0.2 g of Na-laurylsulphate (NaLS) were homogenized in a two-stage Manton Gaulin homogenizer, model 15 M with 200 kg/cm² in the 1st stage and 80 kg/cm² in the 2nd stage for 1-1.5 min. This resulted in an emulsion having a droplet diameter of about 0.1-0.2 μm. To this emulsion was added a seed latex of a monodisperse polystyrene having a particle diameter of 0.65 μm (determined by electron microscopy). An amount of 83.8 ml of seed latex was used containing 77 ml of $H_2O$ and 6.8 ml of polystyrene particles. Further, 6 ml of $H_2O$ and 8.5 ml of acetone were added under ordinary stirring at 35°-40° C. After stirring for 12 hours at 40° C. acetone was removed by evaporation under vacuum. After evaporation of acetone and dichloroethane 1.0 g of Na-laurylsulphate and 840 ml of $H_2O$ were added to provide a total of 1000 ml of $H_2O$. Further, 275 ml of distilled styrene were added under ordinary stirring at 30° C. After stirring for 2 hours at 30° C. the temperature was raised to 60° C. and the polymerisation started. After 25 hours polymerisation a monodisperse latex was obtained having a particle diameter of about 2 μm.

EXAMPLE 2

50 ml of $H_2O$, 5 ml of Perkadox SE 8 (dioctanoyl peroxide) and 1.5 g of NaLS were homogenized. Perkadox SE 8 is an initiator having a melting point of 19° C., and due to the low solubility in water it may act alone as Substance I for the swelling of polymer particles.

After homogenisation the emulsion was charged with a seed latex of monodisperse polybutyl acrylate having a particle diameter of 0.3 μm (determined by electron microscopy). There were used 60.5 ml of seed latex containing 55.5 ml of $H_2O$ and 5 ml of polymer particles. Then 10.5 ml of acetone were added under ordinary stirring at 30° C. After stirring for 3 hours at 30° C. acetone was removed by evaporation under vacuum.

After the evaporation of acetone 894.5 ml of $H_2O$ were added to provide a total of 1000 ml of $H_2O$. Further, 200 ml of distilled styrene were added under ordinary stirring at 30° C. After stirring for 2 hours at 30° C. the temperature was raised to 60° C., and polymerisation was carried out to complete conversion. A monodisperse latex was formed having a particle diameter of about 1 μm.

EXAMPLE 3

20 ml of $H_2O$, 6 ml of Perkadox SE-8 (dioctanoyl peroxide) and 0.2 g of Na-laurylsulphate were homogenized as described in example 1. To this emulsion was added a seed latex of monodisperse polystyrene prepared as described in example 1, having a particle diameter of 1.7 μm (determined by electron microscopy). 41 ml of seed latex were used containing 35 ml of $H_2O$ and 6 ml of polystyrene particles. In addition, 6 ml of acetone were added under ordinary stirring at 25°-30° C. After stirring for 14 hours at 25°-30° C. acetone was removed by evaporation under vacuum.

After evaporation of acetone 1.5 g of NaLS, 1.0 g of Berol 267 (nonyl phenol ethoxylate containing 8 moles of ethylene oxide per mole of nonyl phenol) and 945 ml of $H_2O$ were added to provide a total of 1000 ml of $H_2O$. Then 200 ml of distilled styrene were added under ordinary stirring at 25°-30° C. After stirring for 3 hours at 25°-30° C. the temperature was raised to 70° C., and polymerisation was carried out to complete conversion. The final latex was monodisperse and contained particles having a diameter of about 5 μm.

EXAMPLE 4

35 ml of $H_2O$, 4 ml of Perkadox SE-8 (dioctanoyl peroxide), 3 ml of chlorododecane and 0.2 g of Na-laurylsulphate were homogenized as described in example 1. To this emulsion was added a seed latex of monodisperse polystyrene prepared as described in example 1 having a particle diameter of 2 μm (determined by electron microscopy). 28.5 ml of seed latex were employed containing 25 ml of $H_2O$+3.5 ml of polystyrene particles. In addition 10 ml of $H_2O$ and 7 ml of acetone were added under ordinary stirring at 25°-30° C. After stirring for 14 hours at 25°-30° C. acetone was removed by evaporation under vacuum.

After the evaporation of acetone 1.2 g of NaLS, 1.0 g of Berol 267 and 930 ml of $H_2O$ were added to provide a total of 1000 ml of $H_2O$. Then 175 ml of distilled styrene were added under ordinary stirring at 25°-30° C. After stirring for 3 hours at 25°-30° C. the temperature was raised to 70° C., and polymerisation was carried out to complete conversion. The final latex was monodisperse and contained particles having a diameter of about 7 μm.

EXAMPLE 5

5 ml of dioctanoyl peroxide (Perkadox SE-8), 40 ml of H$_2$O and 0.2 g of NaLS were homogenized (as described in example 1).

After homogenisation the emulsion was added to a latex of monodisperse polystyrene particles having a diameter of 2.20 μm (standard deviation about the mean size was 1.5% as determined by counting 1100 particles on electron micrographs). 30 ml of latex were employed containing 2.4 ml of polymer particles and 27.6 ml of water. After stirring for 48 hours at 25° C., 3.0 g of NaLS and 932 ml of H$_2$O were added to provide a total of 1000 ml of H$_2$O. Further 400 ml of styrene were added under ordinary stirring at 25° C. After stirring for 20 hours at 25° C., an additional volume of 1000 ml of water was added, and the polymerisation started by increasing the temperature to 70° C. After 2 hours polymerisation time 2,0 g of Berol 292 (nonyl phenol ethoxylate containing 20 moles of ethylene oxide per mole of phenol) were added. After polymerisation a monodisperse latex had been obtained with particles having a diameter of 11.5 μm. The yield of monodisperse polymer particles was higher than 98 percent of the theoretical. The standard deviation about the mean particle size was 1.7% as determined by counting 600 particles on optical micrographs.

EXAMPLE 6

12 ml of dioctanoyl peroxide (Perkadox SE-8), 100 ml of H$_2$O and 0.5 g of NaLS were homogenized (as described in example 1).

After homogenisation the emulsion was added to a latex of monodisperse polystyrene particles having a diameter of 3.8 μm (standard deviation about the mean size was 1.8% as determined by counting 850 particles on electron micrographs). 88 ml of latex were employed containing 7 ml of polymer particles and 81 ml of water. After stirring for 30 hours at 25° C., 15 g of NaLS and 3500 ml of H$_2$O were added. Further, a mixture of 850 ml of styrene and 50 ml of divinylbenzene (50% technical grade) were added under ordinary stirring at 25° C. After stirring for 20 hours at 25° C. an additional volume of 3500 ml H$_2$O was added, and the polymerisation started by increasing the temperature to 70° C. After 2 hours polymerisation time 15 g of Berol 292 (nonyl phenol ethoxylate containing 20 moles of ethylene oxide per mole of nonyl phenol) were added. After polymerisation a monodisperse latex had been obtained having a particle diameter of 18.0 μm. The yield of monodisperse polymer particles was about 94% of the theoretical amount. The standard deviation about the mean size was 2.1% as determined by counting 300 particles on optical micrographs.

EXAMPLE 7

30 ml of H$_2$O, 6 ml of stearyl methacrylate and 0.2 g of Na-laurylsulphate were homogenized as described in example 1. The temperature was kept at about 35° C. during the homogenisation. To the emulsion was added a co-polymer latex of styrene and butyl acrylate having a particle diameter of about 0.35 μm (determined by electron microscopy) and a glass transition temperature of about 15° C. 36 ml of latex containing 30 ml of H$_2$O and 6 ml of polymer particles were used. In addition 6 ml of acetone were added under ordinary stirring at about 35° C. After stirring for 5 hours at about 35° C. acetone was removed by evaporation under vacuum.

After evaporation of acetone 2.5 g of Na-laurylsulphate and 940 ml of H$_2$O were added to provide a total of 1000 ml of H$_2$O. Then 210 ml of styrene were added during ordinary stirring at about 35° C. After stirring for 2 hours at about 35° C. 4 g of AIBN dissolved in a small amount of 1,2-dichloroethane were added. After stirring for 1 hour at about 35° C. the temperature was raised to 70° C. and polymerisation was carried out to complete conversion. The final latex contained particles having a diameter of about 1 μm.

EXAMPLE 8

5.3 ml of dioctanoyl peroxide (Perkadox SE-8), 60 ml of H$_2$O and 0.3 g of NaLS were homogenized.

After homogenisation the emulsion was added to a seed latex of monodisperse polystyrene having a particle diameter of 0.52 μm. 33.5 ml of seed latex were employed containing 30 ml of H$_2$O and 3.5 ml of polymer particles. After stirring for 45 hours at 25° C. 1.5 g of NaLS and 910 ml of H$_2$O were added to provide a total of 1000 ml of H$_2$O.

Further 275 ml of methyl methacrylate were added under ordinary stirring at 25° C. After stirring for 1 hour at 25° C. the temperature was raised to 70° C. and the polymerisation carried out. After the polymerisation a monodisperse latex had been obtained having a solids content of about 20% and a particle diameter of 2 μm.

EXAMPLE 9

7 ml of dioctanoyl peroxide (Perkadox SE-8), 70 ml of H$_2$O and 0.4 g of NaLS were homogenized.

After homogenisation the emulsion was added to a latex of monodisperse polystyrene having a particle diameter of 1.5 μm. 18.5 ml of latex were employed containing 15 ml of H$_2$O and 3.5 ml of polymer particles. After stirring for 45 hours at 25° C. 1.4 g of NaLS and 915 ml of H$_2$O were added to provide a total of 1000 ml of H$_2$O.

Further 225 ml of methyl methacrylate were added under ordinary stirring at 25° C. After stirring for 1 hour at 25° C., the temperature was raised to 70° C. and the polymerisation carried out. After polymerisation a monodisperse latex had been obtained having a particle diameter of 5.5 μm and a solids content of about 18%.

EXAMPLE 10

4.5 ml of dioctanoyl peroxide (Perkadox SE-8), 50 ml of H$_2$O and 0.25 g of NaLS were homogenized.

After homogenisation the emulsion was added to a latex of monodisperse polystyrene having a particle diameter of 1.9 μm. 19 ml of latex were employed containing 16 ml of H$_2$O and 3 ml of polymer particles. After stirring for 45 hours at 25° C., 1.55 g of NaLS and 934 ml of H$_2$O were added to provide a total of 1000 ml of H$_2$O.

Further 195 ml of methyl methacrylate were added under ordinary stirring at 25° C. After stirring for 1 hour at 25° C. the temperature was raised to 70° C. and the polymerisation carried out. After polymerisation a monodisperse latex had been obtained having a particle diameter of 7 μm and a solids content of about 15%.

EXAMPLE 11

5 ml of dioctanoyl peroxide (Perkadox SE-8), 50 ml of H$_2$O and 0.25 g of NaLS were homogenized.

After homogenisation the emulsion was added to a copolymer latex containing 70% by volume of styrene and 30% by volume of butyl acrylate and with particle diameter 1.7 μm. 13.5 ml of copolymer latex were employed containing 11 ml of H$_2$O and 2.5 ml of polymer particles. After stirring for 24 hours at 25° C. 1.55 g of NaLS and 939 ml of H$_2$O were added to provide a total of 1000 ml of H$_2$O. Further 130 ml of styrene and 65 ml of butyl acrylate were added under ordinary stirring at 25° C. After stirring for 2 hours at 25° C. the temperature was raised to 70° C. and the polymerisation carried out. After 4 hours polymerisation time, 1.0 g of Berol 292 (nonyl phenol ethoxylate containing 20 moles of ethylene oxide per mole of nonyl phenol) was added. The final latex was monodisperse having a particle diameter of about 7 μm and a solids content of 15%.

EXAMPLE 12

3.3 ml of dioctanoyl peroxide (Perkadox SE-8), 35 ml of H$_2$O and 0.15 g of NaLS were homogenized.

This emulsion was charged with latex of monodisperse polystyrene having a particle diameter of 2 μm. An amount of 6.5 ml of latex was used containing 5.2 ml of H$_2$O and 1.3 ml of polymer particles. Further 2 ml of acetone were added under ordinary stirring at 25° C. After stirring for 45 hours at 25° C. 1.65 g of NaLS and 960 ml of H$_2$O were added to provide a total of 1000 ml of H$_2$O. Further 65 ml of butyl methacrylate and 135 ml of styrene were added under ordinary stirring at 25° C. After stirring for 2 hours at 25° C. the temperature was raised to 70° C. and the polymerisation carried out. After 5 hours polymerisation time 1.0 g of Berol 292 (nonyl phenol ethoxylate containing 20 moles of ethylene oxide per mole of nonyl phenol) was added. The latex obtained was monodisperse having a particle diameter of 11 μm and a solids content of about 15%.

EXAMPLE 13

10 ml of dioctanoyl peroxide, 100 ml of H$_2$O and 0.5 g of NaLS were homogenized.

After homogenisation the emulsion was added to a seed latex of monodisperse polystyrene having a particle diameter of 0.6 μm. 48 ml of seed latex was employed containing 43 ml of H$_2$O and 5 ml of polymer particles. After stirring for 45 hours at 25° C. 1.5 g of NaLS and 857 ml of H$_2$O were added to provide a total of 1000 ml of H$_2$O.

Further 120 ml of methyl methacrylate, 50 ml of hydroxy etyl methacrylate, 50 ml of methacrylic acid and 15 ml of ethylene glycol dimethacrylate were added under ordinary stirring at 25° C. After stirring for 1 hour at 25° C. the temperature was raised to 70° C. and the polymerisation carried out. After 2 hours polymerisation time 1.3 g of Berol 292 (nonyl phenol ethoxylate containing 20 moles of ethylene oxide per mole of nonyl phenol) were added. The final latex was monodisperse having a particle diameter of about 2 μm and a solids content of about 15%.

EXAMPLE 14

18 ml of dioctanoyl peroxide (Perkadox SE-8), 180 ml of H$_2$O and 0.8 g of NaLS were homogenized.

After homogenisation the emulsion was added to a latex of monodisperse polystyrene particles having a diameter of 1.9 μm (standard deviation about the mean size was 2% as obtained, by electron microscopy). 50 ml of emulsion were employed containing 42.5 ml of H$_2$O and 7.5 ml of polymer particles. In addition 13 ml of acetone were added under ordinary stirring at 25° C. After stirring for 48 hours at 25° C. 13 g NaLS and 3500 ml H$_2$O were added. Further a mixture of 400 ml divinylbenzene (50% technical grade) and 800 ml toluene were added under ordinary stirring at 25° C. After stirring for 20 hours at 25° C. an additional volume of 3000 ml H$_2$O containing 10 g of Berol 292 (nonyl phenol ethoxylate with 20 moles of ethylene oxide per mole of nonyl phenol) was added. The polymerisation was carried out by increasing the temperature to 70° C. After polymerisation the particles were isolated and toluene removed from the particles by repeated extractions with acetone. Finally the particles were dried at 80° C. A free flowing powder consisting of 10 μm monodisperse, highly crosslinked porous particles had been obtained. A specific surface area of 530 m$^2$/g was determined by the BET-method. The standard deviation about the mean particle size was 2.5% as determined from optical micrographs. The product yield was higher than 95% of the theoretical.

We claim:

1. A monodisperse dispersion of polymer particles having an average particle diameter of >5 μm produced by a process which comprises:
   (a) preparing an emulsion or dispersion of monodisperse particles comprising:
      (i) polymer and
      (ii) Substance I which is one or more materials having a molecular weight of <5000 and a water solubility of <10$^{-2}$ g/l,
   by adding said Substance I to an aqueous dispersion of monodisperse polymer particles, whereby Substance I is transported through the aqueous phase to said particles which are swelled therewith, under conditions which cause the rate of transport of Substance I through the aqueous phase to be relatively high and then,
   (b) under conditions which are such that the rate of transport of Substance I through the aqueous phase is relatively low, adding to said emulsion or dispersion, Substance II which is one or more partly water-soluble materials, at least one of which is a polymerizable monomer, having a water solubility at least 10 times higher than that of Substance I, whereby Substance II diffuses into the polymer particles containing Substance I at a rate substantially in excess of the rate of departure of Substance I from said polymer particles, the amount of said Substance II diffusing into said particles containing Substance I being at least 20 times that of the original polymer particles used in (a) based on volume and then causing polymerization to take place.

2. The monodisperse dispersion according to claim 1 wherein Substance II is styrene.

3. The monodisperse dispersion according to claim 2, wherein the average particle diameter is about 7 μm.

4. The monodisperse dispersion according to claim 1, wherein the solubility of said Substance I is <10$^{-4}$ g/lH$_2$.

5. The monodisperse dispersion according to claim 1 wherein the solubility of said Substance I is <10$^{-5}$ g/lH$_2$O.

6. The monodisperse dispersion according to claim 1 wherein Substance I has a molcular weight of <500.

7. The monodisperse dispersion according to claim 1 wherein Substance I is added in the form of an aqueous emulsion.

8. The monodisperse dispersion according to claims 1 or 7 wherein step (a) is performed in the presence of a solvent which is wholly or partly soluble in water and is a solvent for Substance I.

9. The monodisperse dispersion according to claim 8, wherein said solvent is acetone or a lower alkanol.

10. The monodisperse dispersion according to claim 8, wherein said solvent is a relatively water-soluble monomer.

11. The monodisperse dispersion according to claim 8 wherein said solvent is employed in an amount of 1–100% of the amount of water, based on volume, in step (a).

12. The monodisperse dispersion according to claim 9 wherein said solvent is employed in an amount of 1–100% of the amount of water, based on volume, in step (a).

13. The monodisperse dispersion according to claim 8 wherein solvent is removed after step (a).

14. The monodisperse dispersion according to claim 1 wherein after step (a), the amount of water in said emulsion or dispersion is increased, emulsifier is or is not added, and then Substance II is added with or without stirring.

15. The monodisperse dispersion according to claim 1 wherein a water soluble or partly water soluble initiator is added in step (b).

16. The monodisperse dispersion according to claim 1 wherein in step (a) an initiator having very low solubility in water is added as a solution in Substance I.

17. The monodisperse dispersion according to claim 1 wherein there is employed as Substance I a liquid initiator for said polymerisation.

18. The monodisperse dispersion according to claim 17 wherein the liquid initiator is dioctanoyl peroxide.

19. The monodisperse dispersion according to claim 1 wherein Substance II is a vinyl monomer.

* * * * *